S. P. WHITESIDE.
TRANSMISSION MECHANISM.
APPLICATION FILED DEC. 29, 1914.
1,178,281.
Patented Apr. 4, 1916.
3 SHEETS—SHEET 3.
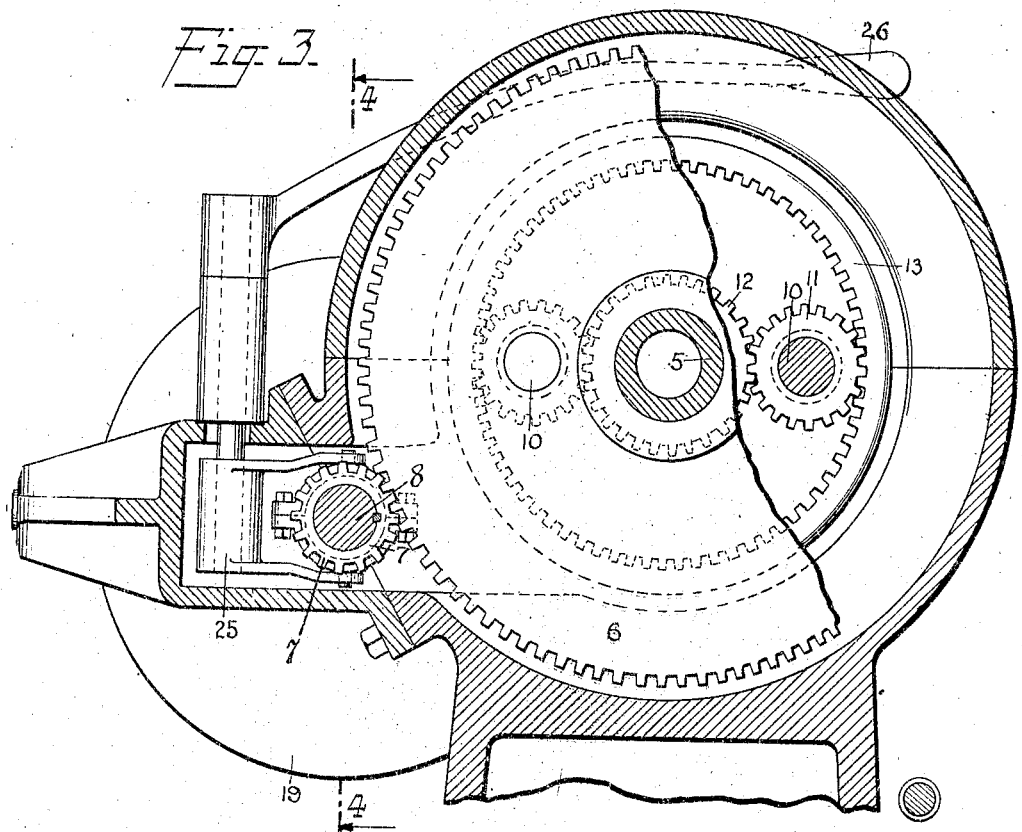
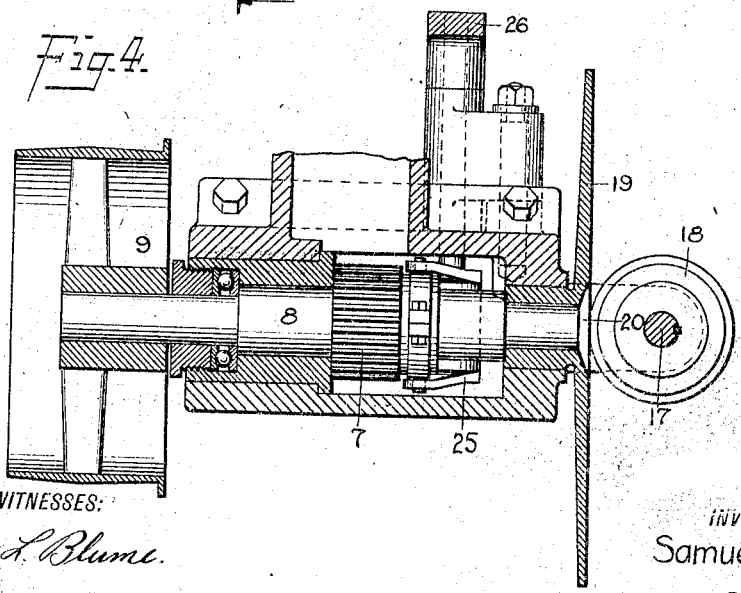
WITNESSES:
George L. Blume.
INVENTOR
Samuel P. Whiteside
BY
ATTORNEY

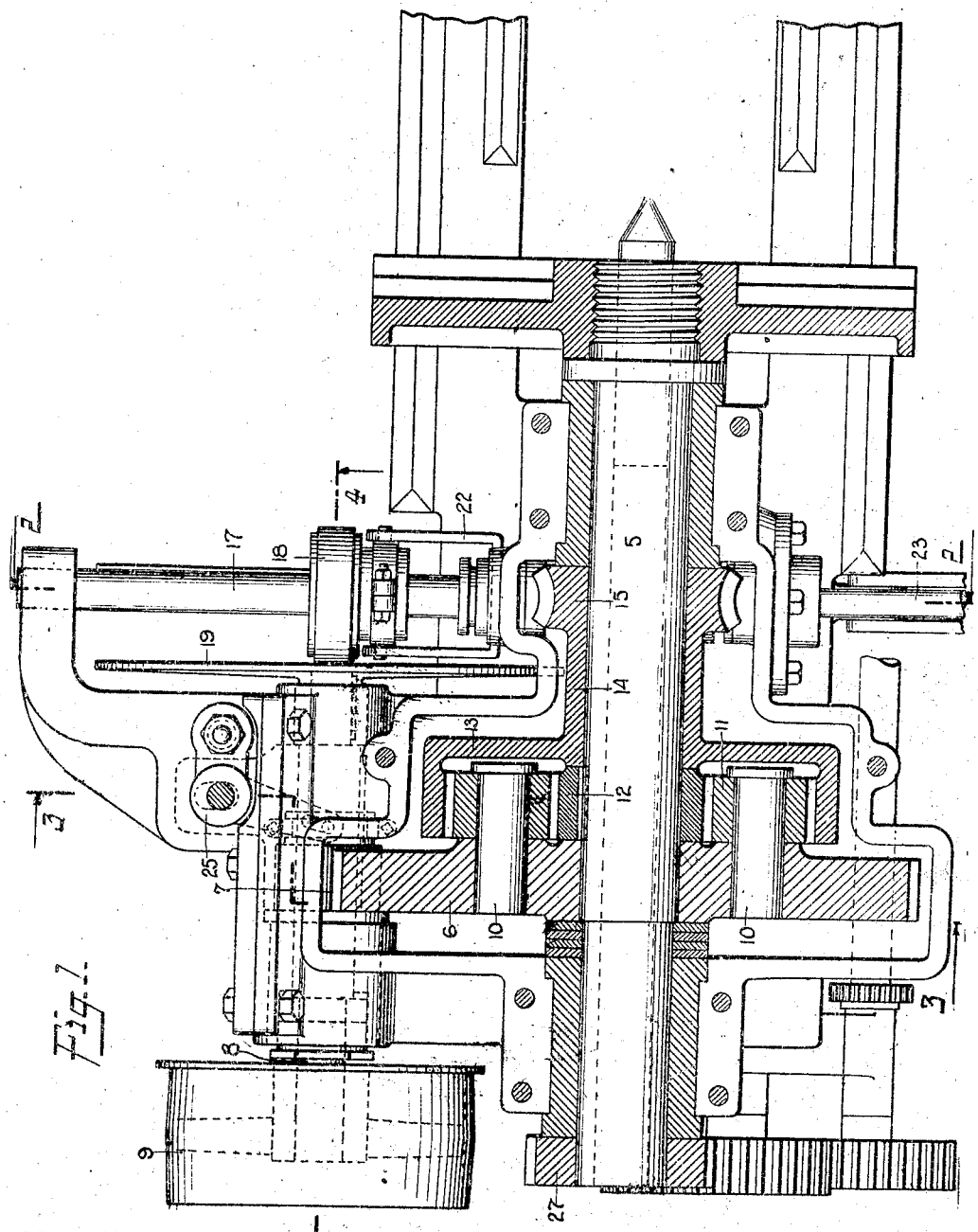

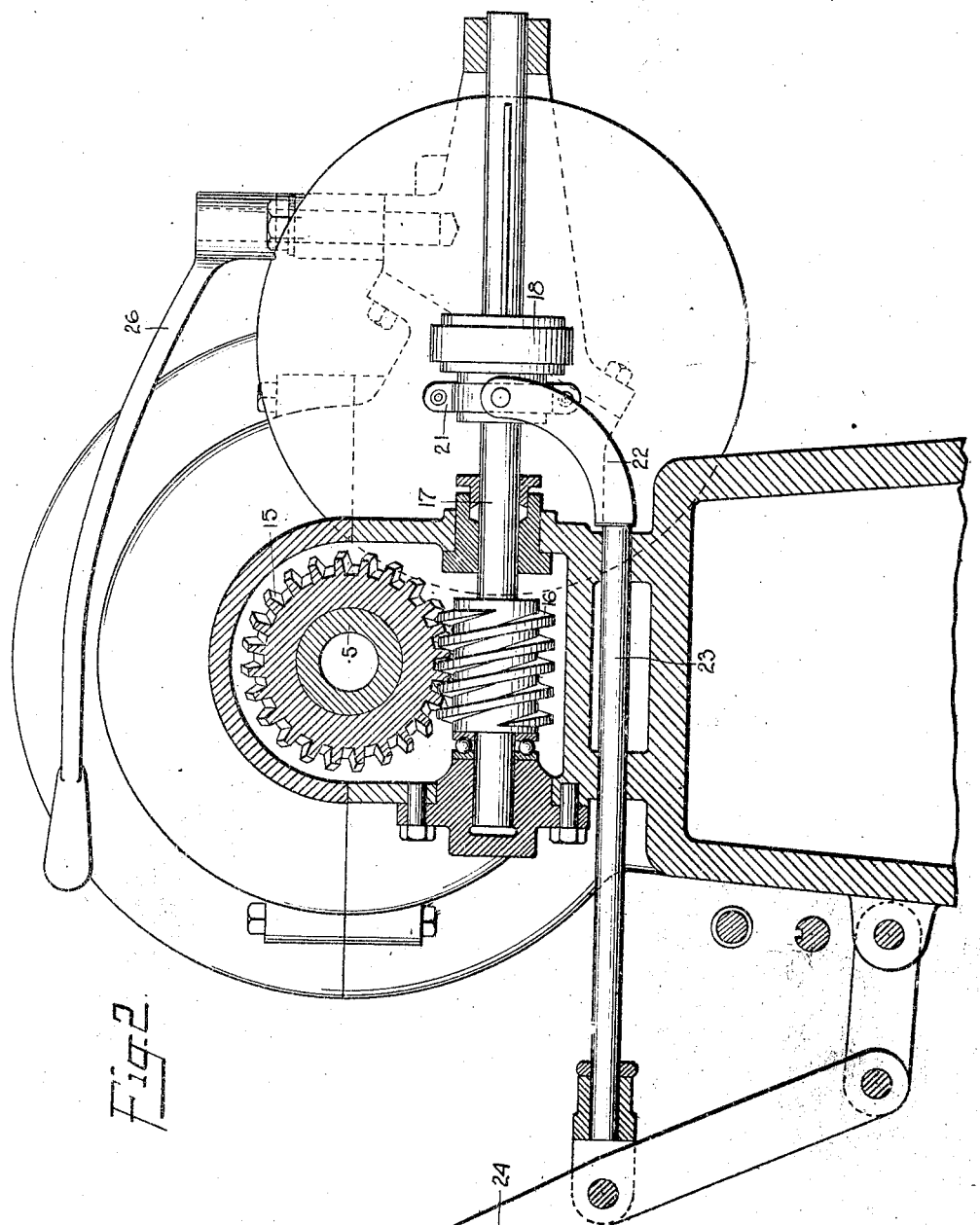

UNITED STATES PATENT OFFICE.

SAMUEL P. WHITESIDE, OF CURTIS BAY, MARYLAND.

TRANSMISSION MECHANISM.

1,178,281.   Specification of Letters Patent.   Patented Apr. 4, 1916.

Application filed December 29, 1914.   Serial No. 879,490.

*To all whom it may concern:*

Be it known that I, SAMUEL P. WHITESIDE, a citizen of the United States, and a resident of Curtis Bay, in the county of Anne Arundel and State of Maryland, have invented a new and Improved Transmission Mechanism, of which the following is a full, clear, and exact description.

My invention relates to transmission mechanisms having a variable speed control and which transmit more power than could be transmitted through the variable speed control directly.

My transmission mechanism is characterized by a positive drive and a friction drive associated therewith and controlling the variable speed of the transmission mechanism, that is, of the positive drive.

An object of the invention is to provide a simple, efficient and strong transmission mechanism wherethrough power may be transmitted at variable speeds and wherein the transmission of the power is through positively engaged means.

With the above and other objects in view, the nature of which will more fully appear as the description proceeds, the invention consists in the novel construction, combination and arrangement of parts as herein fully described, illustrated and claimed.

In the accompanying drawings, forming part of the application, similar characters of reference indicate corresponding parts in all the views, and Figure 1 is a horizontal section through a lathe head embodying my transmission mechanism; Fig. 2 is a vertical transverse section on line 2—2, Fig. 1; Fig. 3 is a similar section on line 3—3, Fig. 1; and Fig. 4 is a vertical section on line 4—4, Fig. 3.

Before proceeding to a more detailed description of my invention it must be clearly understood that although the drawings and description herein refer to the application of the transmission mechanism to a lathe head the same can be used for other mechanisms of similar nature for similar or other purposes. Furthermore, although the planetary system of gears is used for the positive drive, any other combination of gearing may be used, and which will vary according to the space available for the transmission; also, in lieu of using a worm and worm wheel any other helical gearing may be connected to the speed control so that the said gears are driven, not against the load but in the same direction as the load moves.

Referring to the drawings, 5 represents the spindle of the lathe which journals in bearings provided for it in the lathe head. Mounted to turn freely on the spindle is a gear 6 in mesh with a pinion 7, which pinion is mounted to slide but constrained to rotate on a countershaft 8 driven at substantially constant speed by means of a pulley 9 or by any other suitable means. The gear 6 carries two or more pins 10 disposed symmetrically on said gear with respect to the center of the same. Rotatably mounted on each pin 10 is a pinion 11, all the pinions 11 meshing with a pinion 12 keyed to the spindle 5. The pinions 11 are also in mesh with an internal gear 13 provided with a sleeve 14 forming the bearing for said gear on the spindle 5. The said sleeve 14 terminates in a worm wheel 15 which meshes with a worm 16. The worm 16 is mounted on a shaft 17 with which the worm is constrained to rotate. A friction roller 18 is mounted to slide on the shaft 17 but is controlled to rotate therewith. Co-acting with the friction roller 18 is a friction disk 19 secured to the countershaft 8. The central part 20 of said friction disk 19 is hollowed out so that when the friction roller 18 is in alinement with the axis of the countershaft 8 the roller 18 will not wear flat, while the worm 16, as well as the worm wheel and the internal gear 13 integral therewith, remains stationary, although the countershaft may revolve. When the gear 6 is revolved by means of the pinion 7 and the internal gear 13 remains stationary, the pinion 12 will be caused to revolve at a predetermined speed, depending on the speed of the countershaft, and therewith the spindle 5 will be rotated in the same direction, in which the gear 6 revolves. To vary the speed of the spindle 5, to the internal gear 13 any desired speed may be given by means of the friction disk and roller. For this purpose the roller 18 is provided with a collar 21 which bears in a bifurcated end 22 of a slidably mounted rod 23, which rod is in connection with a hand lever 24 suitably attached to the means carrying the transmission mechanism. It will be noted that the bearings for the spindle 5 prevent any axial displacement of the gear 6 or of the internal gear 13 and worm wheel 15 integral therewith. The head casting is so formed that all positively-engaged running parts are in an inclosed casing forming an oil bath for said parts, suitable packings being provided at the places where the shaft ends project out of the casing.

To drive the spindle 5 at the speed of the gear 6 the internal gear 13 is rotated at the speed of the gear 6 by means of the speed control formed by the friction disk and roller by moving the roller 18 toward the periphery of the disk 19. When the internal gear 13 and the gear 6 run at the same speed the pinions 11 will not revolve on pins; consequently when the internal gear 13 is revolved at a speed higher than the gear 6, the spindle will revolve at a slower speed than the gear 6, although the power transmitted to the spindle will be directly through the gear 6, i. e., without passing through the speed control. By increasing the speed of the internal gear 13, the spindle may be made to reverse its direction, that is, it may be made to turn in a direction opposite to the direction of the gear 6. Thus, by controlling the speed of the internal gear, which may vary from zero to any predetermined speed, the spindle 5 may turn at any required speed or be reversed.

Attention is called to the direction of rotation of the worm, which is away from and not against the load; a feature which gives a better result as to wear, as well as permits higher speeds than can be accomplished with the usual worm drive. The friction roller 18 is prevented from running ahead by the frictional resistance between the teeth of the worm wheel and the worm under the action of the load. Since this frictional resistance is considerable, a small power transmitted to the friction roller 18 will control a heavy load carried by the spindle 5 and, consequently, permit the use of a speed-control mechanism through which ordinarily it would be impossible to transmit as heavy a load.

The pinion 7 is provided with a collar engaged by a fork 25 controllable by a handle 26 whereby said pinion 7 can be thrown into or out of engagement with the gear 6. After the pinion 7 is disengaged from the gear 6, the lever 24 is moved to bring the frictional roller 18 in alinement with the hollow 20, so that no part of the transmission mechanism will run except the counter shaft 8 and the disk 19. Before the pinion 7 is engaged with the gear 6 by the handle 26, the lever 24 is moved into a substantially vertical position, at which position of the lever, when the pinion 7 and gear 6 are engaged, the spindle is substantially stationary. The handle 26 can then be operated to engage the pinion with the gear. This engagement will not disturb the load carried by the spindle 5, although power is supplied to the transmission mechanism. By moving the lever 24 toward the transmission casing the spindle will be caused to run backward. By moving the lever 24 away from the casing the spindle will run forward. The speed in either case will be in proportion to the displacement of the lever 24, that is, the displacement of the frictional roller 18.

The spindle 5 as shown in the drawing is provided with a gear 27 which can be secured in the usual way with the lead screw and the feed rod when the transmission mechanism is used for a lathe. It is self-evident that when the transmission mechanism is used for different purposes the connection of the spindle which carries the load will be varied accordingly.

It will be noted that the gears 6, the pinions 11 and 12, and the internal gear 13 form a differential mechanism under the control of a variable speed mechanism, whereby the speed and direction of the positively driven member can be varied.

Attention is called to the fact that when the transmission means formed by the gear is not mounted in the oil casing, the means for driving may be directly attached to the gear 6 and, consequently, the same will become the driving member from where the friction disk 19 can be actuated by any suitable transmission.

From the foregoing description, taken in connection with the accompanying drawings, the advantage of the construction and operation of the device shown will be readily understood by those skilled in the art to which the invention pertains, and while I have described the principle of operation, together with the power transmission mechanism which I now consider to be the best embodiment thereof, I desire to have it understood that the construction shown is merely illustrative and that such changes may be made as are within the scope of the appended claims.

Having thus described my invention, I claim as new and desire to secure by Letters Patent:

1. In a power transmission mechanism, a driving member, a driven member, a pinion mounted to slide on but constrained to rotate with said driving member, a gear free to rotate on the driven member in mesh with said pinion, a second gear free to turn on said driven member, pinions coupling the driven member with said gears, a variable speed friction gearing actuated from the driving member, a worm controlled by the friction gear, and a worm wheel integral with said second gear and meshing with said worm.

2. In a power transmission mechanism, a driving member, a driven member, a pinion mounted to slide on but constrained to rotate with the driving member, a gear free to rotate on the driven member in mesh with the pinion, a second gear free to rotate on the driven member, pinions coupling the driven member with the gears thereon, a friction disk adapted to be actuated by the driving member, a friction roller co-acting with the disk, a worm constrained to rotate with the friction roller, a worm wheel constrained to rotate with the second gear mounted to freely turn on said driven member, said worm wheel meshing with said worm, the rotation of said worm by said friction roller being always away from and not against the load carried by the mechanism.

3. In a power transmission mechanism, a driving member, a driven member, a pinion mounted to slide on and constrained to rotate with the driving member, a gear mounted to rotate on the driven member and in mesh with said pinion, a plurality of pins carried by said gear, pinions mounted to rotate on said pins, a pinion constrained to rotate with the driven member in mesh with said pinions on the pins, a second gear free to turn on said driven member in mesh with said pinions on the pins, a worm wheel integral with said second gear, a friction disk adapted to be actuated by said driving member, a friction roller actuated by the friction disk, and a worm constrained to rotate with said friction roller and in mesh with said worm wheel.

In testimony whereof I have signed my name to this specification in the presence of two subscribing witnesses.

SAMUEL P. WHITESIDE.

Witnesses:
H. WATSON,
LOUIS O. HILDEBRAND.